US011203985B2

(12) United States Patent
Tsunoda et al.

(10) Patent No.: US 11,203,985 B2
(45) Date of Patent: Dec. 21, 2021

(54) COMBUSTOR AND GAS TURBINE

(71) Applicants: MITSUBISHI HEAVY INDUSTRIES, LTD., Tokyo (JP); Mitsubishi Hitachi Power Systems, Ltd., Kanagawa (JP)

(72) Inventors: Naoki Tsunoda, Tokyo (JP); Keijiro Saito, Tokyo (JP); Kenji Miyamoto, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 323 days.

(21) Appl. No.: 16/088,994

(22) PCT Filed: Mar. 24, 2017

(86) PCT No.: PCT/JP2017/012018
§ 371 (c)(1),
(2) Date: Sep. 27, 2018

(87) PCT Pub. No.: WO2017/170227
PCT Pub. Date: Oct. 5, 2017

(65) Prior Publication Data
US 2020/0325831 A1    Oct. 15, 2020

(30) Foreign Application Priority Data

Mar. 30, 2016    (JP) .............................. JP2016-069384

(51) Int. Cl.
*F02C 9/34*        (2006.01)
*F23R 3/14*        (2006.01)
(Continued)

(52) U.S. Cl.
CPC ................ *F02C 9/34* (2013.01); *F02C 7/232* (2013.01); *F02C 9/00* (2013.01); *F02C 9/26* (2013.01); *F23R 3/14* (2013.01); *F23R 3/28* (2013.01)

(58) Field of Classification Search
CPC .... F23R 3/14; F23R 3/286; F23R 3/36; F23D 14/825; F23D 14/82; F23D 2209/10; F02C 7/232; F02C 9/28; F02C 9/26
See application file for complete search history.

(56) References Cited

U.S. PATENT DOCUMENTS 3,283,502 A    11/1966  Lefebvre
5,685,139 A    11/1997  Mick et al.
(Continued)

FOREIGN PATENT DOCUMENTS

CN        1878936        12/2006
CN      101069042        11/2007
(Continued)

OTHER PUBLICATIONS

International Search Report dated May 30, 2017 in corresponding International Application No. PCT/JP2017/012018.
(Continued)

*Primary Examiner* — Todd E Manahan
*Assistant Examiner* — Todd N Jordan
(74) *Attorney, Agent, or Firm* — Wenderoth, Lind & Ponack, L.L.P.

(57) ABSTRACT

A combustor includes: a nozzle main body having a shaft body and a swirl vane; a first fuel flow path configured to supply fuel to a first fuel injection hole defined in the nozzle main body; a second fuel flow path configured to supply fuel to a second fuel injection hole defined in the nozzle main body on a radial outer side of the first fuel injection hole; a first regulating valve provided in the first fuel flow path and configured to regulate a flow rate of the fuel in the first fuel flow path; a temperature sensor-configured to detect a temperature on a downstream side of the swirl vane; and a control device configured to control the first regulating valve so that the flow rate of the fuel in the first fuel flow path is
(Continued)

lowered when the temperature detected by the temperature sensor satisfies a predetermined condition.

3 Claims, 8 Drawing Sheets

(51) Int. Cl.
    *F02C 7/232*     (2006.01)
    *F02C 9/00*     (2006.01)
    *F02C 9/26*     (2006.01)
    *F23R 3/28*     (2006.01)

(56) References Cited

U.S. PATENT DOCUMENTS

| | | | |
|---|---|---|---|
| 8,200,410 B2 | 6/2012 | Williams et al. | |
| 2002/0150142 A1* | 10/2002 | Sanderson | G01K 3/06 374/144 |
| 2003/0121266 A1* | 7/2003 | Modi | F23R 3/286 60/740 |
| 2004/0060301 A1 | 4/2004 | Chen et al. | |
| 2008/0148736 A1 | 6/2008 | Ishizaka et al. | |
| 2008/0289341 A1* | 11/2008 | Ishizaka | F23R 3/14 60/748 |
| 2010/0180564 A1* | 7/2010 | Ziminsky | F23R 3/286 60/39.1 |
| 2010/0275573 A1* | 11/2010 | Frederick | F23N 5/242 60/39.091 |
| 2011/0005189 A1* | 1/2011 | Uhm | F23N 5/242 60/39.281 |
| 2014/0000264 A1 | 1/2014 | Saito et al. | |
| 2015/0354825 A1 | 12/2015 | Kajimura et al. | |

FOREIGN PATENT DOCUMENTS

| | | |
|---|---|---|
| CN | 101878395 | 11/2010 |
| CN | 104969006 | 10/2015 |
| JP | 7-119492 | 5/1995 |
| JP | 9-101009 | 4/1997 |
| JP | 10-19258 | 1/1998 |
| JP | 2006-336996 | 12/2006 |

OTHER PUBLICATIONS

Written Opinion of the International Searching Authority dated May 30, 2017 in corresponding International Application No. PCT/JP2017/012018 (with English translation).

* cited by examiner

COMBUSTOR AND GAS TURBINE

CROSS-REFERENCE TO RELATED APPLICATION

Priority is claimed from Japanese Patent Application No. 2016-69384, filed Mar. 30, 2016, the content of which is incorporated herein by reference.

TECHNICAL FIELD

The present invention relates to a combustor and a gas turbine.

BACKGROUND ART

In general, a gas turbine includes: a compressor which compresses outside air to generate compressed air; a combustor which generates a high temperature and high pressure combustion gas by combustion of fuel in the compressed air; and a turbine rotationally driven by the combustion gas.

In order to improve efficiency of the gas turbine, it is necessary to raise an inlet temperature of the turbine, but there is a problem in that NOx increases exponentially in accordance with a temperature rise. As a countermeasure against an increase in NOx, for example, a combustor disclosed in Japanese Unexamined Patent Application, First Publication No. 2006-336996 includes a burner that inhibits formation of a local high temperature region by forming a uniform gas mixture by a swirling flow.

The burner of the combustor includes a nozzle which is a shaft body extending along a burner axis, a burner cylinder which surrounds an outer circumference of the nozzle and ejects compressed air and fuel toward a downstream side, and a swirl vane for swirling a fluid in the burner cylinder around the burner axis.

SUMMARY OF INVENTION

Technical Problem

It is known that, when a premixed gas to which swirling is applied burns, a phenomenon in which flames move upstream (vortex core flashback) occurs frequently at a center of a swirling flow. When abnormal combustion such as vortex core flashback occurs, since there is a likelihood of the flames adhering to a nozzle and causing thermal damage to the nozzle, it is desired to inhibit occurrence of such abnormal combustion.

It is an objective of the present invention to provide a combustor and a gas turbine in which thermal damage to the combustor is prevented when abnormal combustion occurs.

Solution to Problem

According to a first aspect of the present invention, a combustor includes a nozzle main body having a shaft body extending along an axis and a swirl vane protruding from an outer circumferential surface of the shaft body in a radial direction of the axis to swirl a fluid flowing toward a downstream side in an axial direction around the axis, a first fuel flow path which supplies fuel to a first fuel injection hole formed in the nozzle main body, a second fuel flow path which supplies fuel to a second fuel injection hole formed on a radial outer side of the first fuel injection hole in the nozzle main body, a first regulating valve provided in the first fuel flow path and configured to regulate a flow rate of the fuel flowing through the first fuel flow path, a temperature sensor which detects a temperature on a downstream side of the swirl vane, and a control device which controls the first regulating valve so that the flow rate of the fuel flowing through the first fuel flow path is lowered when a temperature detected by the temperature sensor satisfies a predetermined condition.

According to such a configuration, when abnormal combustion occurs and a temperature detected by the temperature sensor satisfies the predetermined condition, fuel injected from the first fuel injection hole is decreased to immediately decrease a fuel concentration on the downstream side of the nozzle main body, and thereby thermal damage to the combustor can be prevented.

According to a second aspect of the present invention, in the combustor according to the first aspect, the temperature sensor may be disposed at a distal end of the shaft body.

According to such a configuration, it is possible to prevent thermal damage to the nozzle main body when vortex core flashback occurs.

According to a third aspect of the present invention, in the combustor according to the second aspect, the control device may control the first regulating valve so that the flow rate of the fuel flowing through the first fuel flow path is lowered when the temperature detected by the temperature sensor has risen from a steady-state value by more than a predetermined temperature.

According to a fourth aspect of the present invention, a gas turbine includes a combustor according to any one of the first to third aspects, a compressor which compresses air to supply the compressed air to the combustor, and a turbine driven by a combustion gas formed by combustion of fuel in the combustor.

According to a fifth aspect of the present invention, a gas turbine includes a combustor according to the first aspect, a compressor which compresses air to supply the air to the combustor, and a turbine driven by a combustion gas formed by combustion of fuel in the combustor, wherein a temperature sensor detects a temperature of an exhaust gas of the turbine.

According to such a configuration, in a conventional gas turbine having a temperature sensor for detecting a temperature of an exhaust gas of the turbine, it is possible to prevent thermal damage to the combustor without providing an additional temperature sensor.

Advantageous Effects of Invention

According to the present invention, when abnormal combustion occurs and a temperature detected by the temperature sensor satisfies a predetermined condition, fuel injected from the first fuel injection hole is decreased to immediately decrease a fuel concentration on the downstream side of the nozzle main body, and thereby thermal damage to the combustor can be prevented.

DESCRIPTION OF EMBODIMENTS

First Embodiment

A gas turbine 1 of a first embodiment of the present invention will be described in detail with reference to the drawings.

Figure 1:
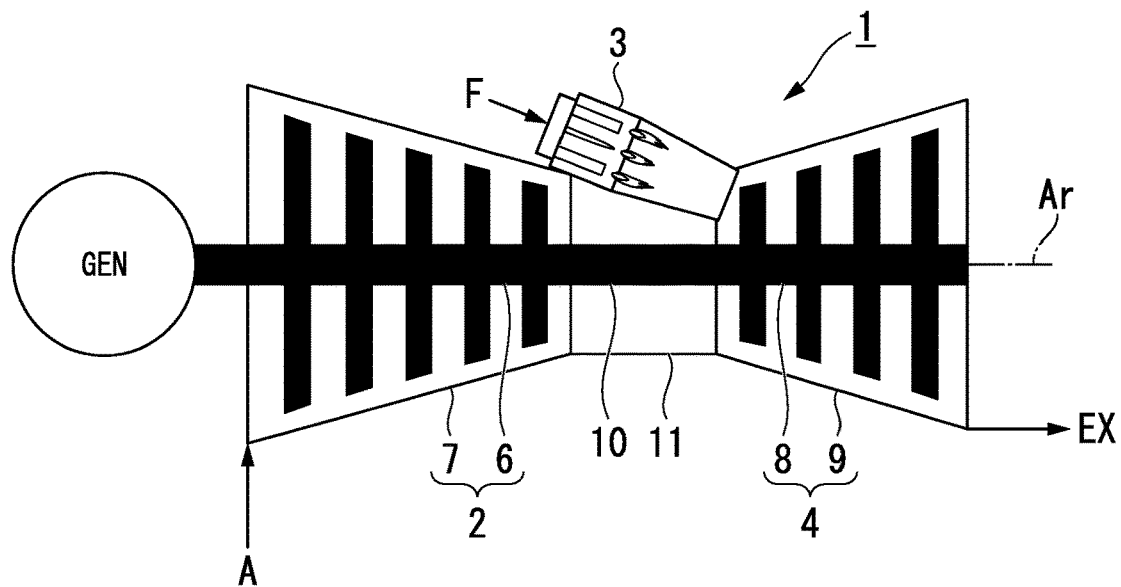
FIG. 1 is a schematic view showing a configuration of a gas turbine according to a first embodiment of the present invention.

As shown in FIG. 1, the gas turbine 1 of the present embodiment includes a compressor 2 which compresses an air A to generate compressed air, a plurality of combustors 3 which generate a high temperature and high pressure combustion gas by combustion of a fuel F in the compressed air, and a turbine 4 rotationally driven by the combustion gas.

The compressor 2 includes a compressor rotor 6 which rotates around a rotation axis Ar, and a compressor casing 7 which rotatably covers the compressor rotor 6. The turbine 4 includes a turbine rotor 8 which rotates around the rotation axis Ar, and a turbine casing 9 which rotatably covers the turbine rotor 8.

The rotation axis of the compressor rotor 6 and the rotation axis of the turbine rotor 8 are positioned on the same straight line. The compressor rotor 6 and the turbine rotor 8 are connected to each other and form a gas turbine rotor 10. The compressor casing 7 and the turbine casing 9 are connected to each other and form a gas turbine casing 11.

To the gas turbine rotor 10, for example, a rotor of a generator GEN is connected. The combustors 3 are fixed to the gas turbine casing 11.

Figure 2:
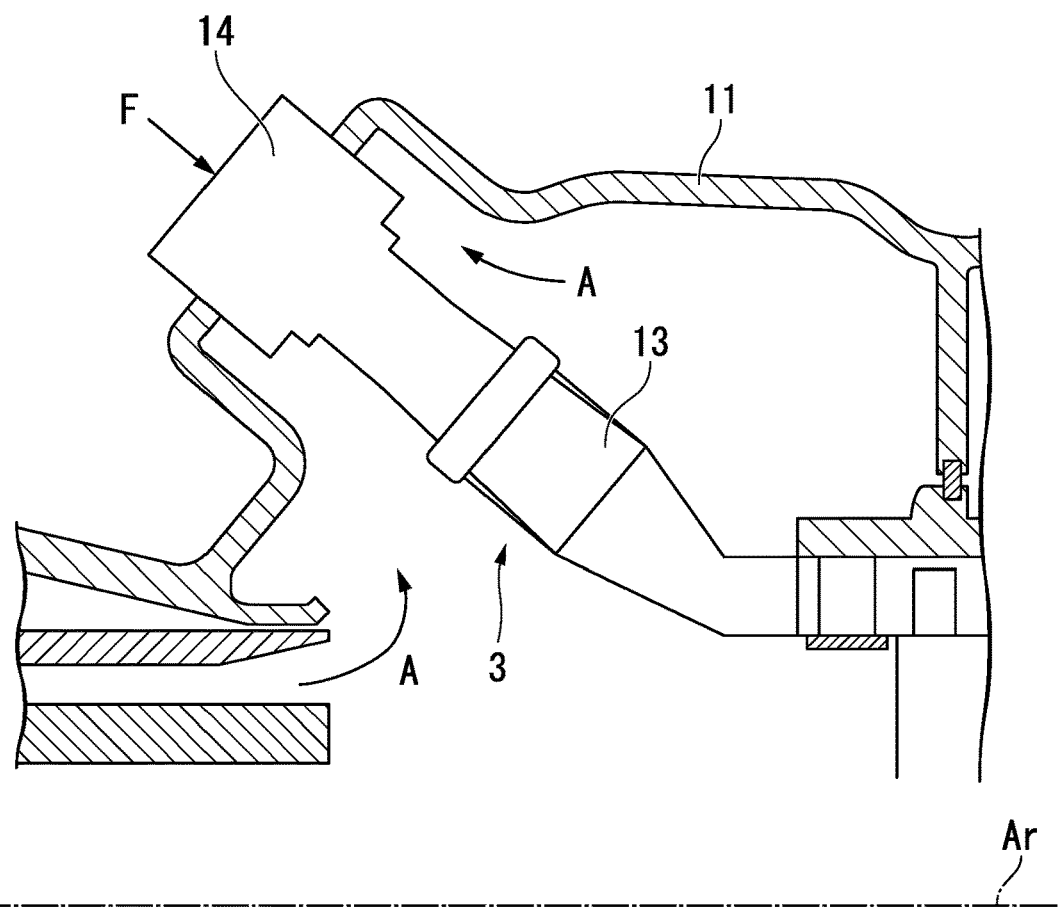
FIG. 2 is a cross-sectional view around a combustor of the gas turbine according to the first embodiment of the present invention.

As shown in FIG. 2, each of the combustors 3 includes a combustion liner 13 (or tail liner) which burns the fuel F therein and sends a combustion gas generated as a result of combustion of the fuel F to the turbine 4, and a fuel ejector 14 which ejects the fuel F and the air A into the combustion liner 13. The combustor 3 of the present embodiment is of a dual type capable of oil combustion as well as gas combustion.

Figure 3:
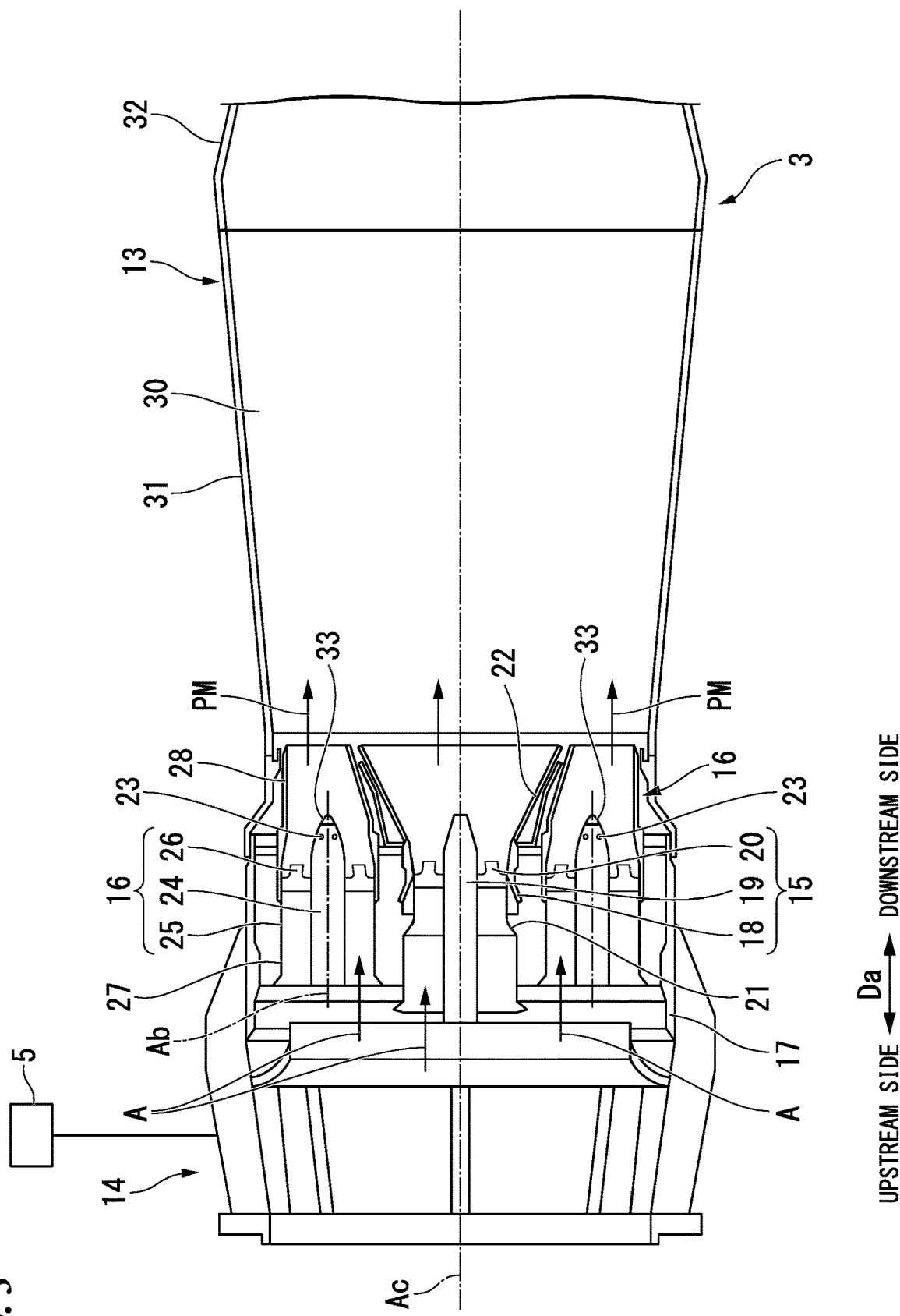
FIG. 3 is a cross-sectional view of the combustor according to the first embodiment of the present invention.

As shown in FIG. 3, the fuel ejector 14 includes a pilot burner 15 which performs diffusion combustion of injected fuel, a main burner 16 (nozzle main body) which performs premixed combustion of injected fuel, a burner holding cylinder 17 which holds the pilot burner 15 and the main burner 16, and a control device 5.

The pilot burner 15 includes a pilot nozzle 19 which is a shaft body extending in an axial direction Da around an combustor axis Ac, a pilot burner cylinder 18 which covers an outer circumference of the pilot nozzle 19, and a plurality of swirl vanes 20 which swirl the compressed air A around the combustor axis Ac. Here, one side in the axial direction Da, which is a direction in which the combustor axis Ac extends, is referred to as an upstream side (a left side in FIG. 3), and the other side is referred to as a downstream side (a right side in FIG. 3). The combustor axis Ac is also a burner axis of the pilot burner 15.

An injection hole is formed at a downstream end portion of the pilot nozzle 19. The plurality of swirl vanes 20 are provided on an upstream side of a position at which the injection hole is formed. Each of the swirl vanes 20 extends in a direction including a radial direction component from the outer circumference of the pilot nozzle 19 and is connected to an inner circumferential surface of the pilot burner cylinder 18.

The pilot burner cylinder 18 includes a main body portion 21 positioned on the outer circumference of the pilot nozzle 19 and a cone portion 22 connected to a downstream side of the main body portion 21 and gradually enlarged in diameter toward a downstream side. The compressed air A compressed by the compressor 2 flows into the pilot burner cylinder 18 from an upstream side thereof. The pilot burner cylinder 18 ejects fuel injected from the pilot nozzle 19 together with the compressed air A from a downstream end thereof. This fuel is diffused and burned in the combustion liner 13.

A plurality of main burners 16 are arranged in a circumferential direction around the combustor axis Ac to surround an outer circumferential side of the pilot burner 15.

Each of the main burners 16 includes a main nozzle 24 which is a shaft body extending along a burner axis Ab parallel to the combustor axis Ac, a main burner cylinder 25 which covers an outer circumference of the main nozzle 24, and a plurality of swirl vanes 26 which swirl the compressed air A around the burner axis Ab.

Since the burner axis Ab of the main burner 16 is parallel to the combustor axis Ac, an axial direction concerning the combustor axis Ac and an axial direction concerning the burner axis Ab are in the same direction. An upstream side in the axial direction concerning the combustor axis Ac is the upstream side in the axial direction concerning the burner axis Ab, and a downstream side in the axial direction concerning the combustor axis Ac is the downstream side in the axial direction concerning the burner axis Ab.

A fuel oil injection hole 23 for injecting fuel oil is formed in the vicinity of a distal end of the main nozzle 24.

The plurality of swirl vanes 26 are provided at an intermediate portion in the axial direction Da of the main nozzle 24. The main burner cylinder 25 includes a main body portion 27 positioned on an outer circumference of the main nozzle 24, and an extension portion 28 connected to a downstream side of the main body portion 27 and extending toward the downstream side.

The plurality of swirl vanes 26 are connected to an inner circumferential surface of the main body portion 27 of the main burner cylinder 25. A plurality of gas fuel injection holes 38 (see FIG. 4) for injecting gas fuel are formed in the plurality of swirl vanes 26. Fuel oil or gas fuel is supplied into the main nozzle 24, and the gas fuel is supplied from the main nozzle 24 to the swirl vanes 26.

The compressed air A compressed by the compressor 2 flows into the main burner cylinder 25 from an upstream side thereof. In the main burner cylinder 25, the compressed air A and the gas fuel injected from the swirl vanes 26 are mixed to form a premixed gas PM. The main burner cylinder 25 ejects the premixed gas PM from a downstream end thereof. The fuel in the premixed gas PM is subjected to premixed combustion in the combustion liner 13.

At the time of an oil combustion operation, fuel oil is supplied to the compressed air A via the fuel oil injection hole 23.

The burner holding cylinder 17 has a cylindrical shape around the combustor axis Ac and covers an outer circumferential side of the plurality of main burner cylinders 25.

The combustion liner 13 includes a combustion portion 31 having a cylindrical shape around the combustor axis Ac and forming a combustion region 30 in which fuel ejected from the main burner 16 and the pilot burner 15 is burned, and a combustion gas guide portion 32 having a cylindrical shape and guiding a combustion gas generated by combustion of the fuel into a combustion gas flow path of the turbine 4. The combustion gas guide portion 32 of the combustion liner 13 is formed on a downstream side of the combustion portion 31 of the combustion liner 13.

Figure 4:
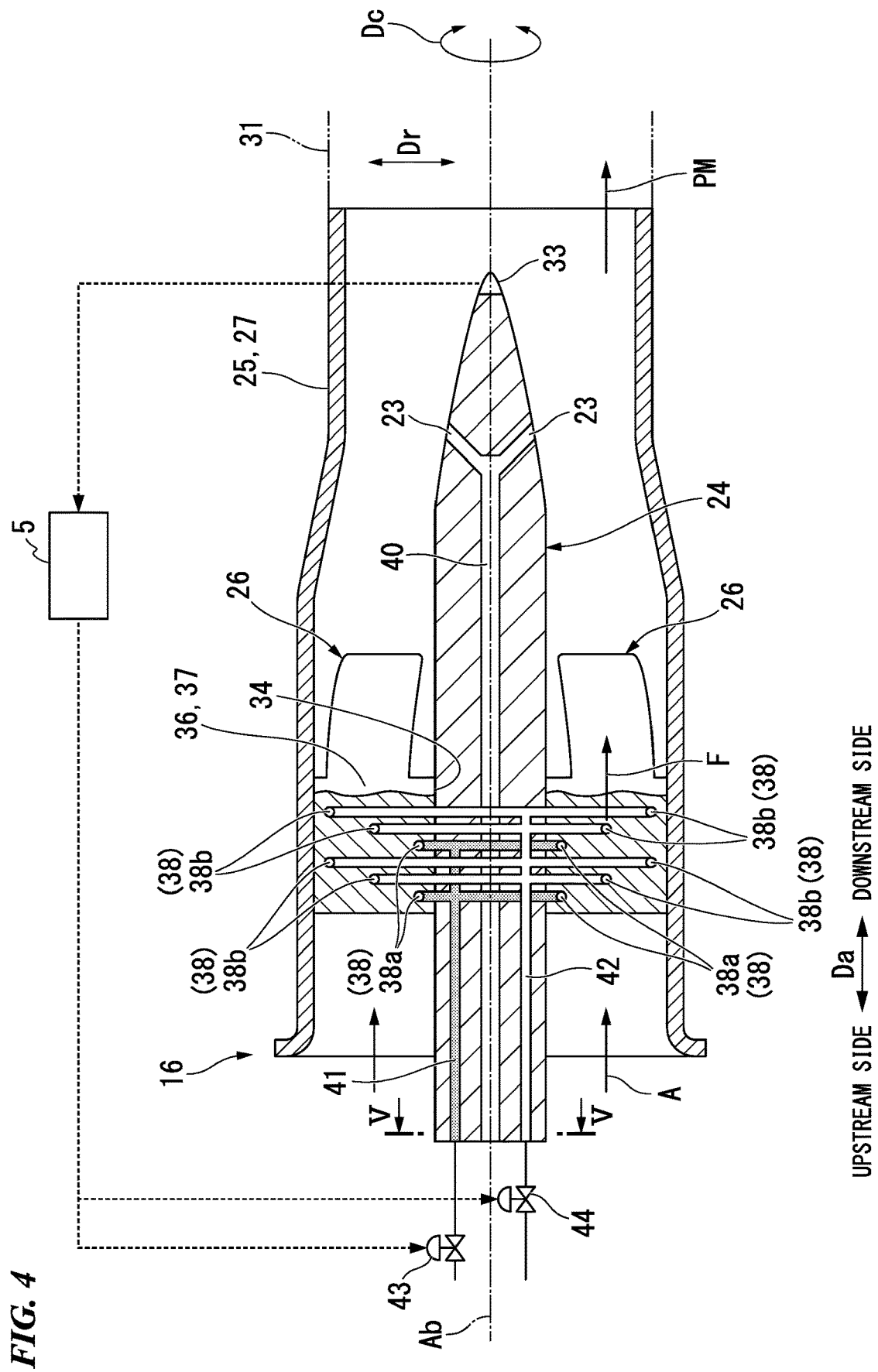
FIG. 4 is a cross-sectional view of a burner according to the first embodiment of the present invention.

As shown in FIG. 4, each of the swirl vanes 26 of the main burner 16 protrudes in a radial direction from an outer circumferential surface of the main nozzle 24 and is connected to an inner circumferential surface of the main burner cylinder 25. The swirl vane 26 is formed so that a fluid flowing on the downstream side swirls around the burner axis Ab.

A temperature sensor 33 is provided at a distal end of the main nozzle 24. The temperature sensor 33 is connected to the control device 5. That is, a temperature of the distal end of the main nozzle 24 measured by the temperature sensor 33 is transmitted to the control device 5.

For the temperature sensor 33, for example, a thermocouple can be used. The temperature sensor 33 is not limited to a thermocouple, and other temperature measuring means can be employed.

The swirl vane 26 includes a nozzle side connection portion 34 connected to the outer circumferential surface of the main nozzle 24, and a profile portion 36 in which a profile surface 37 which is smoothly continuous for swirling a fluid around the burner axis Ab is formed. In the following description, a circumferential direction around the burner axis Ab is simply referred to as a circumferential direction Dc and a radial direction Dr centered on the burner axis Ab is simply referred to as the radial direction Dr.

A plurality of gas fuel injection holes 38 for injecting the gas fuel F are formed in the swirl vanes 26. The gas fuel injection holes 38 include a plurality of first gas fuel injection holes 38a (first fuel injection holes) disposed on a radial inner side, and a plurality of second gas fuel injection holes 38b (second fuel injection holes) disposed on a radial outer side of the first gas fuel injection holes 38a. That is, the first gas fuel injection holes 38a are disposed closer to the main nozzle 24 than the second gas fuel injection holes 38b.

The number of second gas fuel injection holes 38b is preferably more than the number of first gas fuel injection holes 38a. It is not necessary for all the second gas fuel injection holes 38b to be disposed on the radial outer side with respect to the first gas fuel injection holes 38a.

The main burner 16 includes a fuel oil flow path 40 which injects fuel oil from the fuel oil injection hole 23 of the main nozzle 24, a first gas fuel flow path 41 (first fuel flow path) which injects the gas fuel F from the first gas fuel injection holes 38a of the swirl vanes 26, and a second gas fuel flow path 42 (second fuel flow path) which injects the gas fuel F from the second gas fuel injection holes 38b of the swirl vanes 26.

A first regulating valve 43 which regulates a flow rate of the gas fuel F flowing through the first gas fuel flow path 41 is provided in the first gas fuel flow path 41. A second regulating valve 44 which regulates a flow rate of the gas fuel F flowing through the second gas fuel flow path 42 is provided in the second gas fuel flow path 42. The first regulating valve 43 and the second regulating valve 44 can be controlled by the control device 5.

The control device 5 regulates a flow rate of the gas fuel F using the first regulating valve 43 and the second regulating valve 44 on the basis of a temperature of the distal end of the main nozzle 24 measured by the temperature sensor 33.

Figure 5:
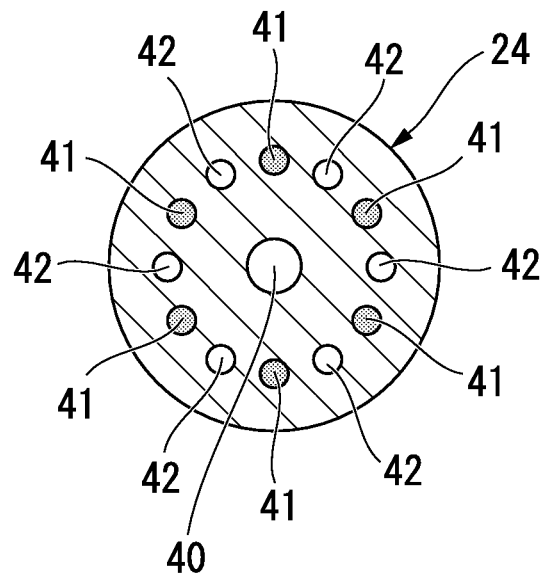
FIG. 5 is a cross-sectional view showing an arrangement of a gas fuel pipe and a fuel oil flow path viewed in a direction of arrows V-V in FIG. 4.
Figure 6:
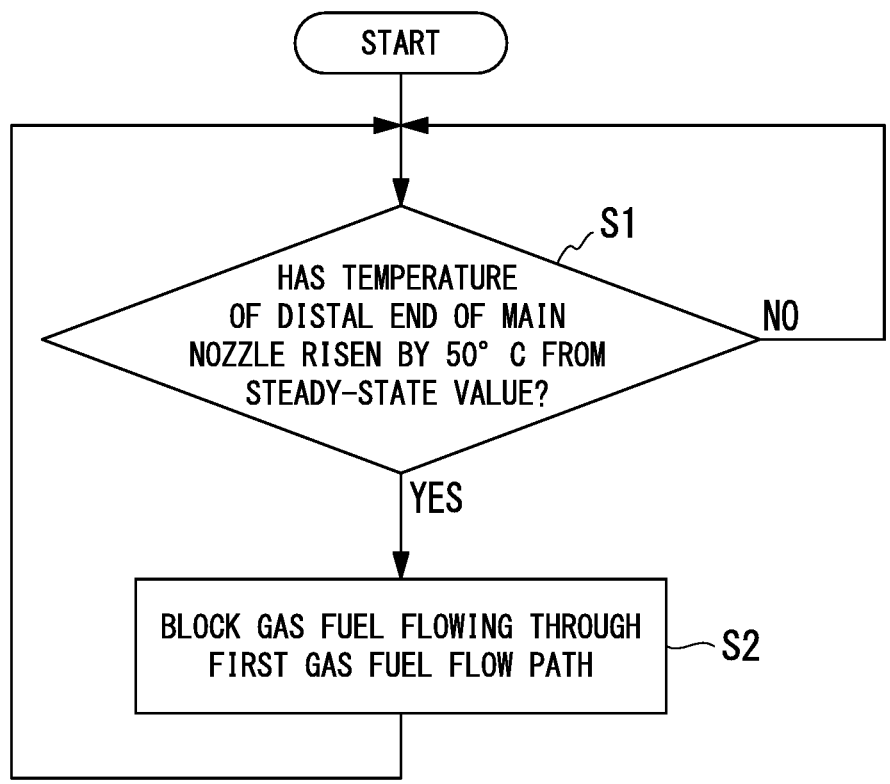
FIG. 6 is a flowchart describing a method of controlling the combustor according to the first embodiment of the present invention.

As shown in FIG. 5, the fuel oil flow path 40 is formed substantially at a center of the main nozzle 24. The first gas fuel flow paths 41 and the second gas fuel flow paths 42 are alternately formed on a radial outer side of the fuel oil flow path 40 at intervals in the circumferential direction. An arrangement of the fuel oil flow path 40 and the gas fuel flow paths 41 and 42 is not limited thereto.

Next, an operation and actions of the gas turbine 1 of the present embodiment will be described.

The compressor 2 suctions outside air and compresses the suctioned air. The air compressed by the compressor 2 is guided into the main burner 16 and the pilot burner 15 of the combustor 3. Fuel is supplied to the main burner 16 and the pilot burner 15 from a fuel supply source. The main burner 16 ejects the premixed gas PM in which fuel and air are premixed into the combustion portion 31 of the combustion liner 13. The premixed gas PM is subjected to premixed combustion in the combustion portion 31. The pilot burner 15 ejects each of fuel and air into the combustion portion 31 of the combustion liner 13. This fuel is subjected to diffusion combustion or premixed combustion in the combustion portion 31. The above-described combustion modes can be arbitrarily changed by selecting a fuel ejection portion of the pilot burner 15. A high temperature and high pressure combustion gas generated by combustion of the fuel in the combustion portion 31 of the combustion liner 13 is guided into the combustion gas flow path of the turbine 4 by the combustion gas guide portion 32 of the combustion liner 13, and thereby the turbine rotor 8 is rotated.

Air compressed by the compressor 2 is introduced into the main burner cylinder 25 from an upstream end thereof. The air swirls around the burner axis Ab from the plurality of swirl vanes 26 in the main burner cylinder 25. Gas fuel is injected into the main burner cylinder 25 from the gas fuel injection holes 38 of the plurality of swirl vanes 26. At the time of the oil combustion operation, the fuel oil F is injected into the main burner cylinder 25 from the fuel oil injection hole 23.

The gas fuel F injected from the swirl vanes 26 and the air A flowing toward the downstream side while swirling are premixed in the main burner cylinder 25, and then injected from a downstream end of the main burner cylinder 25 into the combustion liner 13 as the premixed gas PM.

Mixing of the gas fuel F injected into the main burner cylinder 25 from the gas fuel injection holes 38 of the plurality of swirl vanes 26 and the air A is promoted by a swirling flow formed by the plurality of swirl vanes 26. A flame holding effect of premixed flames formed by the combustion of the premixed gas PM is enhanced due to the premixed gas PM being ejected from the main burner cylinder 25 into the combustion liner 13 while swirling.

Next, a method of controlling the combustor 3 of the present embodiment will be described.

The method of controlling the combustor 3 of the present embodiment includes a temperature rise determination step S1 of determining whether or not a temperature at the distal end of the main nozzle 24 has risen by 50° C. from a steady-state value, and a gas fuel blocking step S2 of blocking the gas fuel F flowing through the first gas fuel flow path 41 when the temperature at the distal end of the main nozzle 24 has risen by 50° C. from the steady-state value.

In the temperature rise determination step S1, the control device 5 monitors the temperature of the distal end of the main nozzle 24 measured by the temperature sensor 33. The control device 5 determines whether or not the temperature at the distal end of the main nozzle 24 has risen by 50° C. from the steady-state value.

When the temperature of the distal end of the main nozzle 24 is lower than a temperature 50° C. above the steady-state value, an operation thereof is continued without regulating the first regulating valve 43 and the second regulating valve 44.

The steady-state value is a temperature value in normal operation of the gas turbine 1 and is appropriately set according to the use of the gas turbine 1.

The criterion of 50° C. used for the temperature rise determination step S1 can be appropriately changed. That is, in the temperature rise determination step S1, it is determined whether or not the temperature at the distal end of the main nozzle 24 measured by the temperature sensor 33 has risen from a steady-state value by more than a predetermined temperature.

For example, when the premixed gas PM to which swirling is applied burns, flames may move upstream due to vortex core flashback. Thereby, when the temperature of the distal end of the main nozzle 24 has risen to a temperature equal to or higher than 50° C. above the steady-state value, the step proceeds to the gas fuel blocking step S2.

In the gas fuel blocking step S2, the control device 5 operates the first regulating valve 43 such that the gas fuel F flowing through the first gas fuel flow path 41 is blocked. Thereby, the gas fuel F is not injected from the first gas fuel injection holes 38a. The control device 5 blocks the first regulating valve 43 and controls the second regulating valve 44 such that a flow rate of the gas fuel F flowing through the second gas fuel flow path 42 is increased. The control device 5 operates the second regulating valve 44 such that a total amount of the injected gas fuel F does not change before and after the gas fuel blocking step S2.

In the gas fuel blocking step S2, the flow rate of the gas fuel F may be lowered without blocking the gas fuel F flowing through the first gas fuel flow path 41. There is no need to increase the amount of the gas fuel F flowing through the second gas fuel flow path 42 after blocking the gas fuel F flowing through the first gas fuel flow path 41.

When the gas fuel F supplied from the first gas fuel injection holes 38a disposed on a radial inner side is blocked in the gas fuel blocking step S2, a fuel concentration around the vortex core of the vortex core flashback decreases.

After blocking the gas fuel F flowing through the first gas fuel flow path 41, when the temperature at the distal end of the main nozzle 24 has recovered to the steady-state value, the control device 5 operates the first regulating valve such that the gas fuel F flows through the first gas fuel flow path 41.

According to the above-described embodiment, when the vortex core flashback occurs and the temperature detected by the temperature sensor 33 satisfies a predetermined condition, the fuel F injected from the first gas fuel injection holes 38a can be decreased. As a result, the fuel concentration around the vortex core of the vortex core flashback can be instantly lowered to prevent thermal damage to the main nozzle 24.

In the above-described embodiment, the gas fuel injection holes 38 for injecting the gas fuel F are formed in the swirl vanes 26, and the gas fuel F is injected into the main burner cylinder 25 from the gas fuel injection holes 38. However, instead of forming the gas fuel injection holes 38 in the swirl vanes 26, a member in which a gas fuel injection hole is formed separately or the like may also be provided.

An installation position of the temperature sensor 33 is not limited to the distal end portion of the main nozzle 24 as long as the temperature on the downstream side of the swirl vanes 26 can be measured. A plurality of temperature sensors 33 may be disposed.

Second Embodiment

Hereinafter, a combustor according to a second embodiment of the present invention will be described in detail with reference to the drawings. In the present embodiment, differences from the above-described first embodiment will be mainly described, and description of similar portions will be omitted. The combustor of the present embodiment is of a gas single-fuel combustion type in which only gas fuel is used.

Figure 7:
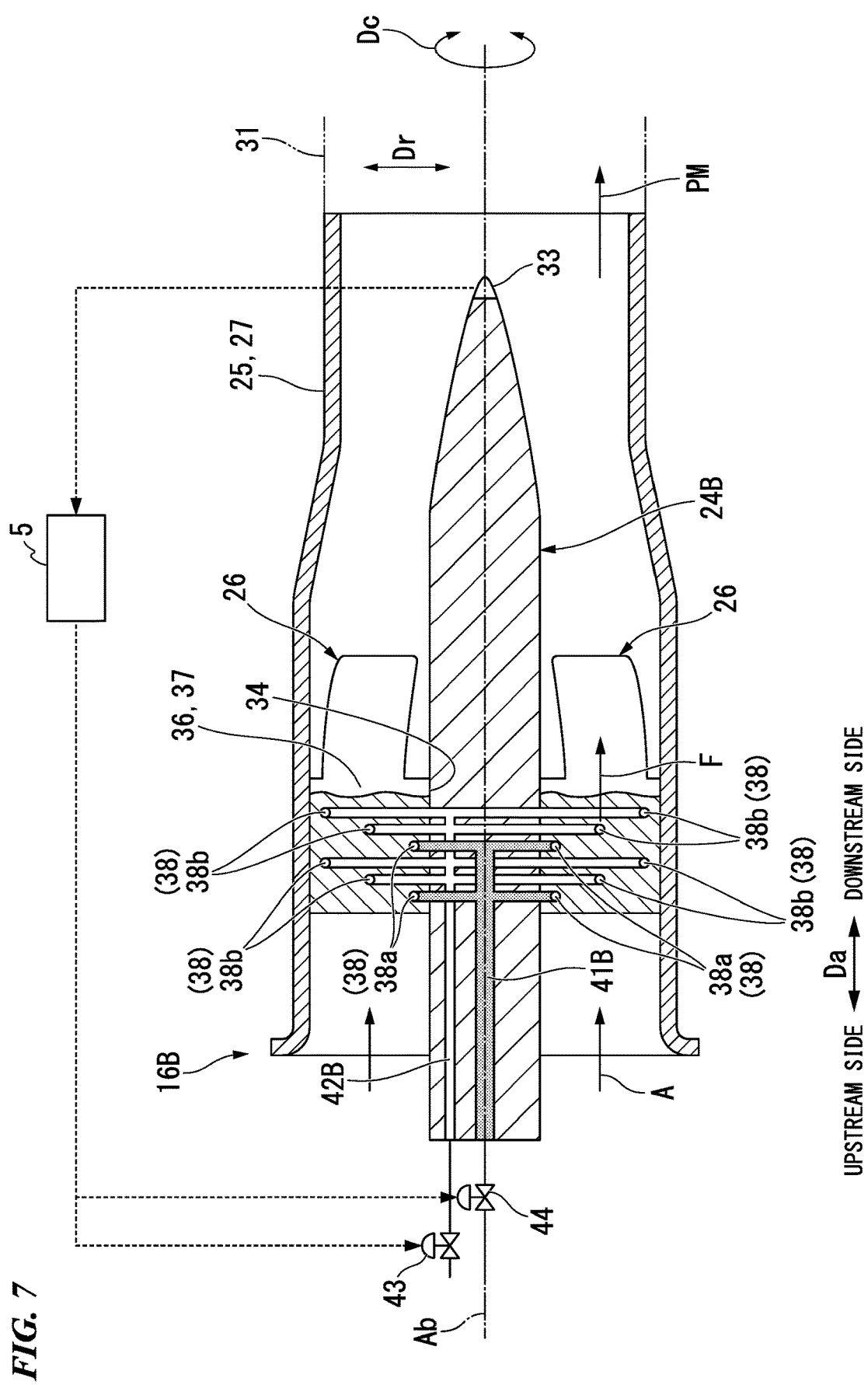
FIG. 7 is a cross-sectional view of a burner according to a second embodiment of the present invention.
Figure 8:
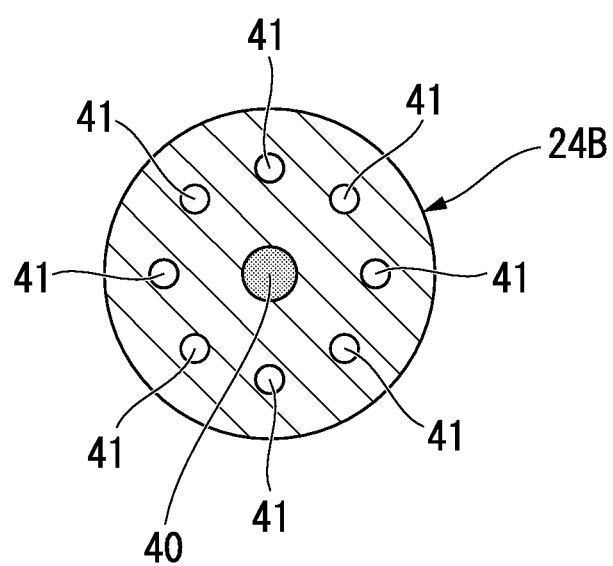
FIG. 8 is a cross-sectional view showing an arrangement of a gas fuel pipe viewed in a direction of arrows VIII-VIII in FIG. 7.

As shown in FIG. 7, a main burner 16B of the present embodiment includes a first gas fuel flow path 41B and a plurality of second gas fuel flow paths 42B. As shown in FIG. 8, the first gas fuel flow path 41B is disposed substantially at a center of a main nozzle 24B. The second gas fuel flow paths 42B are disposed on a radial outer side of the first gas fuel flow path 41B at intervals in the circumferential direction.

The first gas fuel flow path 41B is connected to first gas fuel injection holes 38a disposed on a radial inner side of swirl vanes 26. The second gas fuel flow paths 42B are connected to second gas fuel injection holes 38b disposed on a radial outer side with respect to the first gas fuel injection holes 38a.

According to the above-described embodiment, a structure of the main nozzle 24B can be simplified. Thereby, it possible to reduce the cost of the gas turbine 1.

Third Embodiment

Hereinafter, a combustor according to a third embodiment of the present invention will be described in detail with reference to the drawings. In the present embodiment, differences from the above-described second embodiment will be mainly described, and description of similar portions will be omitted. The combustor of the present embodiment is of a gas single-fuel combustion type in which only gas fuel is used.

Figure 9:
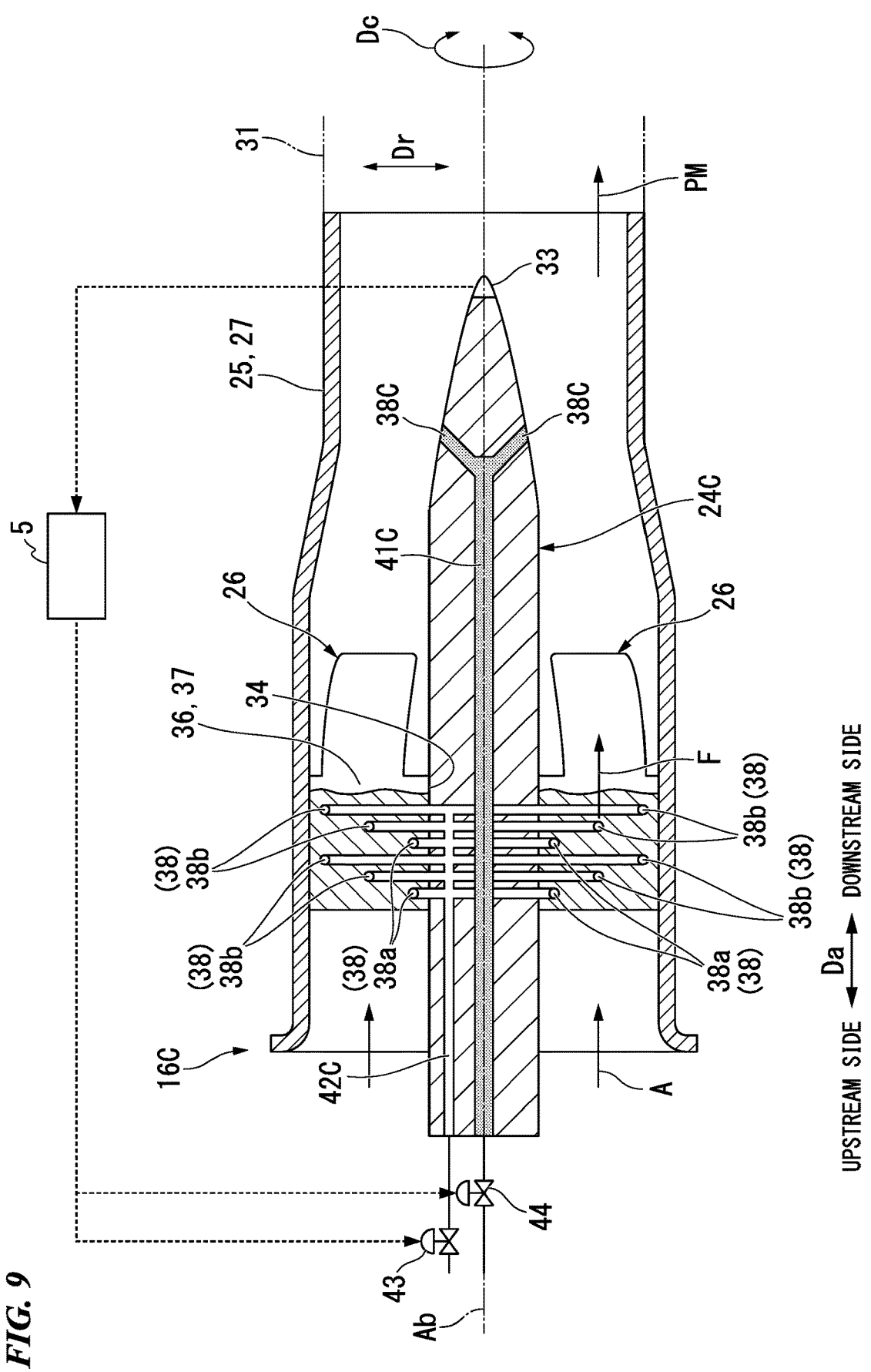
FIG. 9 is a cross-sectional view of a burner according to a third embodiment of the present invention.

As shown in FIG. 9, the main burner 16C of the present embodiment includes a first gas fuel flow path 41C and a plurality of second gas fuel flow paths 42C. Similarly to the combustor of the second embodiment, the first gas fuel flow path 41C is disposed substantially at a center of a main nozzle 24C. The second gas fuel flow paths 42C are disposed on a radial outer side of the first gas fuel flow path 41C at intervals in a circumferential direction.

The first gas fuel flow path 41C of the present embodiment is connected to a plurality of distal end gas fuel injection holes 38C formed in the vicinity of a distal end of the main nozzle 24C. The distal end gas fuel injection holes 38C are formed to be inclined radially outward toward a downstream side. The second gas fuel flow paths 42C are connected to all gas fuel injection holes 38 formed in swirl vanes 26.

The gas fuel injection holes 38 are disposed on a radial outer side with respect to the distal end gas fuel injection holes 38C.

According to the above-described embodiment, the distal end gas fuel injection holes 38C connected to the first gas fuel flow path 41C can be disposed further radially inward. According to the above-described embodiment, a structure of the main nozzle 24C can be simplified. Thereby, it is possible to reduce the cost of the gas turbine 1.

Fourth Embodiment

Hereinafter, a combustor according to a fourth embodiment of the present invention will be described in detail with reference to the drawings. In the present embodiment, differences from the above-described first embodiment will be mainly described, and description of similar portions will be omitted.

Figure 10:
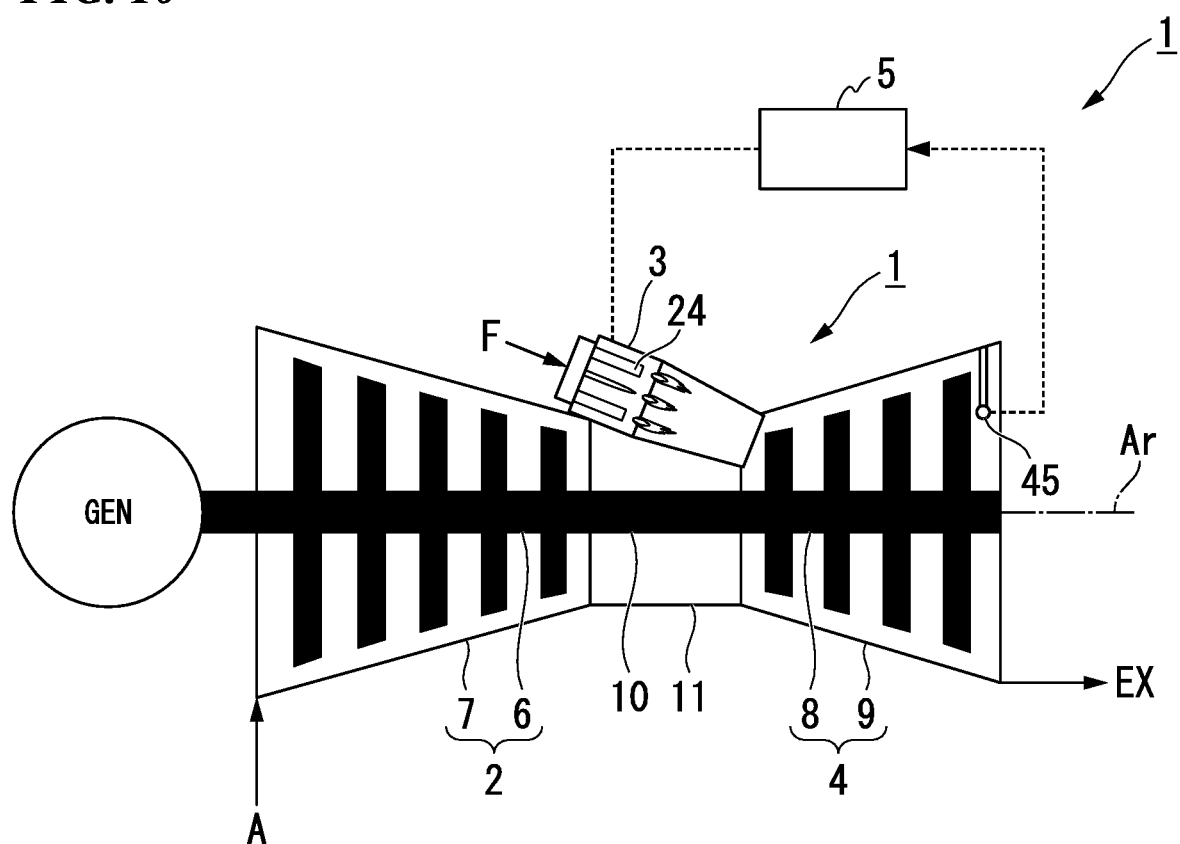
FIG. 10 is a schematic view showing a configuration of a gas turbine according to a fourth embodiment of the present invention.

As shown in FIG. 10, in the vicinity of a final stage of a turbine 4 of a gas turbine 1 according to the present embodiment, a BPT (Blade Path Temperature) sensor 45 is provided to measure a temperature of an exhaust gas (hereinafter referred to as "blade path temperature") immediately after the final stage of the turbine 4. On the other hand, no temperature sensor is provided at a distal end of the main nozzle 24 of the present embodiment.

For the BPT sensor 45, for example, a thermocouple or the like is used. The blade path temperature measured by the BPT sensor 45 is transmitted to the control device 5.

In the temperature rise determination step S1, the control device 5 of the present embodiment compares a blade path temperature at the time of measurement with a blade path temperature 60 seconds before the measurement at intervals of every 10 seconds, and determines whether or not there is a temperature difference of ±2° C. or more two consecutive times.

When the above-described temperature difference occurs, the control device 5 determines that abnormal combustion has occurred in a combustor 3, and executes the gas fuel blocking step S2.

According to the above-described embodiment, when abnormal combustion occurs and a temperature detected by the BPT sensor 45 satisfies a predetermined condition, the gas fuel F injected from the first gas fuel injection holes 38a (see FIG. 4) is decreased to immediately decrease a fuel concentration on the downstream side of the main nozzle 24, and thereby thermal damage to the combustor 3 can be prevented.

According to the above-described embodiment, in the conventional gas turbine 1 having the BPT sensor 45 for detecting a temperature of the exhaust gas of the turbine 4, it is possible to prevent thermal damage to the combustor 3 without providing a temperature sensor at the distal end of the main nozzle 24.

A configuration of the main burner 16 of the present embodiment is not limited to the configuration of the main burner 16 of the first embodiment, and the configuration of the main burner 16 of the second embodiment and the third embodiment can also be employed.

Although the embodiments of the present invention have been described in detail as above, various modifications can be made within the scope of the present invention without departing from the technical spirit of the present invention.

INDUSTRIAL APPLICABILITY

According to the above-described embodiments, when abnormal combustion occurs and a temperature detected by the temperature sensor satisfies a predetermined condition, fuel injected from the first fuel injection holes is decreased to immediately decrease a fuel concentration on the downstream side of the nozzle main body, and thereby thermal damage to the combustor can be prevented.

REFERENCE SIGNS LIST

1 Gas turbine
2 Compressor
3 Combustor
4 Turbine
5 Control device
13 Combustion liner
14 Fuel ejector
15 Pilot burner
6, 16B, 16C Main burner (nozzle main body)
19 Pilot nozzle
20 Swirl vane
23 Fuel oil injection hole
24, 24B, 24C Main nozzle (shaft body)
26 Swirl vane
33 Temperature sensor
38 Gas fuel injection hole
38a First gas fuel injection hole (first fuel injection hole)
38b Second gas fuel injection hole (second fuel injection hole)
40 Fuel oil flow path
41, 41B, 41C First gas fuel flow path (first fuel flow path)
42, 42B, 42C Second gas fuel flow path (second fuel flow path)
43 First regulating valve
44 Second regulating valve
45 BPT sensor
Ab Burner axis
Ac Combustor axis
Da Axial direction
S1 Temperature rise determination step
S2 Gas fuel blocking step

The invention claimed is:
1. A combustor comprising:
a nozzle main body including a shaft body extending along an axis and a swirl vane configured to swirl a fluid flowing toward a downstream side in an axial direction around the axis;
a first fuel flow path configured to supply fuel to a first fuel injection hole, wherein the first fuel injection hole is defined in the nozzle main body;
a second fuel flow path configured to supply fuel to a second fuel injection hole defined in the nozzle main body, wherein the second fuel injection hole is radially outward of the first fuel injection hole;
a first regulating valve provided in the first fuel flow path and configured to regulate a flow rate of the fuel flowing through the first fuel flow path;
a second regulating valve provided in the second fuel flow path and configured to regulate a flow rate of the fuel flowing through the second fuel flow path;
a temperature sensor disposed at a distal end of the shaft body and located on the shaft body downstream of the swirl vane, wherein the temperature sensor is configured to detect a temperature; and
a control device connected to the temperature sensor and configured to control the first regulating valve and the second regulating valve so that the flow rate of the fuel flowing through the first fuel flow path is lowered and the flow rate of the fuel flowing through the second fuel flow path is maintained or increased when the temperature detected by the temperature sensor satisfies a predetermined condition.

2. The combustor according to claim 1, wherein the control device is configured to control the first regulating valve so that the flow rate of the fuel flowing through the first fuel flow path is lowered when the temperature detected by the temperature sensor has risen from a steady-state value by more than a predetermined temperature.

3. A gas turbine comprising:
   the combustor according to claim 1;
   a compressor configured to compress air to supply compressed air to the combustor; and
   a turbine configured to be driven by a combustion gas formed by combustion of fuel in the combustor.

* * * * *